(12) United States Patent
Zhang

(10) Patent No.: US 12,093,288 B2
(45) Date of Patent: Sep. 17, 2024

(54) METHOD, DEVICE AND PROGRAM PRODUCT FOR GENERATING CONFIGURATION INFORMATION OF STORAGE SYSTEM

(71) Applicant: EMC IP Holding Company LLC, Hopkinton, MA (US)

(72) Inventor: Yongmei Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 260 days.

(21) Appl. No.: 17/335,503

(22) Filed: Jun. 1, 2021

(65) Prior Publication Data

US 2022/0253467 A1    Aug. 11, 2022

(30) Foreign Application Priority Data

Feb. 5, 2021    (CN) .......................... 202110164381.7

(51) Int. Cl.
*G06F 16/28*    (2019.01)
*G06F 3/06*    (2006.01)

(52) U.S. Cl.
CPC .......... *G06F 16/289* (2019.01); *G06F 16/288* (2019.01)

(58) Field of Classification Search
CPC .............................. G06F 16/289; G06F 16/288
See application file for complete search history.

(56) References Cited

U.S. PATENT DOCUMENTS

| | | | |
|---|---|---|---|
| 8,949,863 B1 | 2/2015 | Coatney et al. | |
| 9,209,973 B2 | 12/2015 | Aikas et al. | |
| 9,444,822 B1 | 9/2016 | Borowiec et al. | |
| 9,465,653 B2 * | 10/2016 | Kishore | G06F 11/3476 |
| 10,212,031 B2 * | 2/2019 | Subramanian | H04L 41/5058 |
| 11,301,152 B1 | 4/2022 | Sillifant | |
| 2005/0223046 A1 * | 10/2005 | Smith | G06F 16/2282 |
| 2013/0080624 A1 * | 3/2013 | Nagai | G06F 11/0709 709/224 |
| 2016/0357439 A1 * | 12/2016 | Uehara | G06F 3/0629 |
| 2021/0026865 A1 * | 1/2021 | He | G06F 16/284 |

OTHER PUBLICATIONS

Lutfiyya, Hanan L., et al. "Configuration maintenance for distributed applications management." Journal of Network and Systems Management 8 (2000): 219-244. (Year: 2000).*

* cited by examiner

*Primary Examiner* — Mohsen Almani
(74) *Attorney, Agent, or Firm* — BainwoodHuang

(57) ABSTRACT

Techniques for generating configuration information of a storage system involve: acquiring, in response to receiving a request to generate configuration information of a storage system, attribute information of an object created in the storage system. The techniques further involve: acquiring a first ontology item corresponding to the object based on the attribute information, the first ontology item describing a relationship between the object and an operation executed for the object. The techniques further involve: acquiring a second ontology item corresponding to the operation. The techniques further involve: generating the configuration information of the storage system based at least on the first ontology item and the second ontology item. Such techniques enable users to quickly obtain the configuration information of the system, thereby increasing the query efficiency and improving the user experience.

19 Claims, 6 Drawing Sheets

300

DPRO Identifier: 00000201
Name: Executable
Label: Executable
Attribute: Relationship
Description: Indicating that the operation is executable on the object
Note: Counterparty for un-executable (00000202) ... ...

DPRO Identifier: 00000202
Name: Un-executable
Label: Un-executable
Attribute: Relationship
Description: Indicating that the operation is un-executable on the object
Note: Counterparty for executable (00000201) ... ...

⋮

DPRO Identifier: 00000206
Name: Restore
Label: Restore
Attribute: Action
Description: Restoring data for a corresponding time point from the snapshot
Note: Used to restore (00000206) snapshot (00000501) ... ...

DPRO Identifier: 00000207
Name: Session-1
Label: Synchronous session in active state
Description: Synchronous replication session (00000205) in active state (00000340)
Note: Restore (00000206) is un-executable (00000202) for the snapshot on this session ... ...

DPRO Identifier: 00000208
Name: Session-2
Label: Asynchronous session in idle state
Description: Asynchronous replication session (00000230) in idle state (00000350)
Note: Restore (00000206) is executable (00000201) for the snapshot on this session ... ...

DPRO Identifier: 00000209
Name: Session-3
Label: Synchronous session in suspended state
Description: Synchronous replication session (00000205) in suspended state (00000360)
Note: Restore (00000206) is executable (00000201) for the snapshot on this session ... ...

METHOD, DEVICE AND PROGRAM PRODUCT FOR GENERATING CONFIGURATION INFORMATION OF STORAGE SYSTEM

CROSS-REFERENCE TO RELATED APPLICATION

This application claims priority to Chinese Patent Application No. CN202110164381.7, on file at the China National Intellectual Property Administration (CNIPA), having a filing date of Feb. 5, 2021, and having "METHOD, DEVICE AND PROGRAM PRODUCT FOR GENERATING CONFIGURATION INFORMATION OF STORAGE SYSTEM" as a title, the contents and teachings of which are herein incorporated by reference in their entirety.

TECHNICAL FIELD

Embodiments of the present disclosure relate to the field of storage systems and, more specifically, to a method, a device, and a program product for generating configuration information of a storage system.

BACKGROUND

With the rapid development of computer technology, the amount of data is growing rapidly. With the emergence of large amounts of data, storage of data is becoming more and more important. In the field of data storage, in order to protect the security of data, it is necessary to ensure that disaster recovery protection can be realized for the stored data. Therefore, in the field of data storage, Data Protect and Recovery (DPR) is a basic requirement for data storage systems. Copies and snapshots play a major role in the field of DPR because they guarantee the recovery or protection of the stored data. However, there are still many issues that need to be solved in the field of data storage.

SUMMARY OF THE INVENTION

Embodiments of the present disclosure provide a method, a device, and a program product for generating configuration information of a storage system.

According to a first aspect of the present disclosure, a method for generating configuration information of a storage system is provided. The method includes: acquiring, in response to receiving a request to generate configuration information of a storage system, attribute information of an object created in the storage system. The method further includes: acquiring a first ontology item corresponding to the object based on the attribute information, the first ontology item describing a relationship between the object and an operation executed for the object. The method further includes: acquiring a second ontology item corresponding to the operation. The method further includes: generating the configuration information of the storage system based at least on the first ontology item and the second ontology item.

According to a second aspect of the present disclosure, an electronic device is provided. The electronic device includes: at least one processor; and a memory coupled to the at least one processor and having instructions stored thereon, wherein the instructions, when executed by the at least one processor, cause the device to perform actions including: acquiring, in response to receiving a request to generate configuration information of a storage system, attribute information of an object created in the storage system; acquiring a first ontology item corresponding to the object based on the attribute information, the first ontology item describing a relationship between the object and an operation executed for the object; acquiring a second ontology item corresponding to the operation; and generating the configuration information of the storage system based at least on the first ontology item and the second ontology item.

According to a third aspect of the present disclosure, a computer program product is provided, which is tangibly stored on a non-volatile computer-readable medium and includes machine-executable instructions, wherein the machine-executable instructions, when executed, cause a machine to perform the steps of the method in the first aspect of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

FIG. 3 illustrates a schematic diagram of document 300 of configuration information according to embodiments of the present disclosure;

The same or corresponding reference numerals in the various drawings represent the same or corresponding portions.

DETAILED DESCRIPTION

Figure 1:
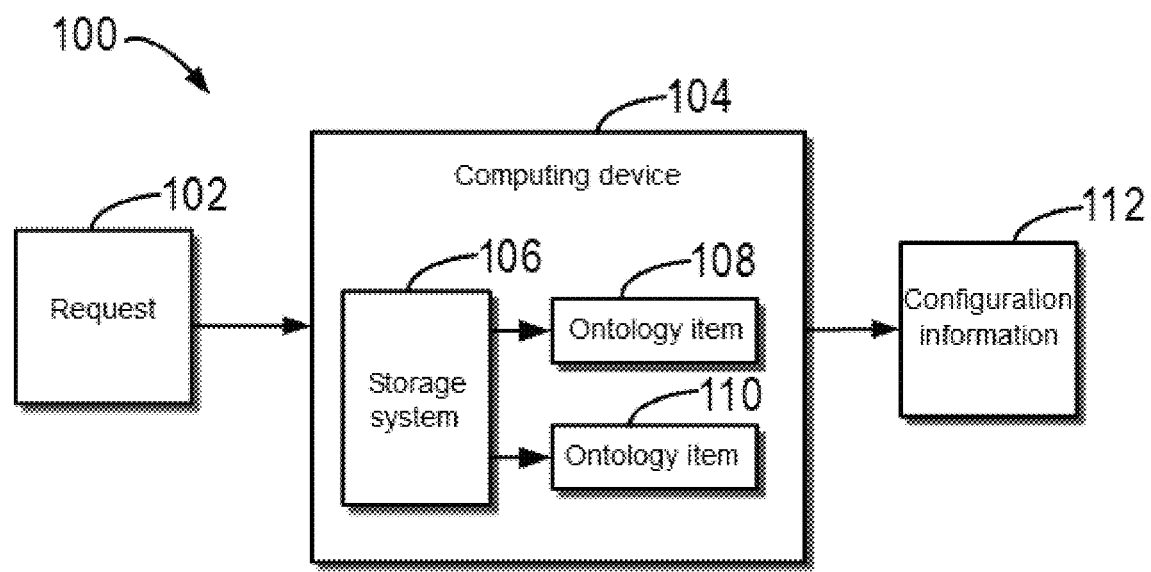
FIG. 1 illustrates a schematic diagram of example environment 100 in which the device and/or method according to embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," and the like may refer to different or the same objects. Other explicit and implicit definitions may also be included below.

In the description of embodiments of the present disclosure, the term "ontology" refers to a "formalized, clear, and detailed description of a shared conceptual system." An ontology is a special type of terminology that has structural characteristics and is more suitable for use in computer systems; or in other words, an ontology is in effect a formal representation of a set of concepts (e.g., aspects/features/characteristics/resources/etc.) and their interrelationships in a particular field, such as the field of storage systems.

The term "ontology item" herein is an item in an ontology that is a description defining an individual or entity, and the description may include an identifier, a name, a label, an attribute, a functional definition of an ontology item, and/or interrelationship between ontology items. As an example, an ontology item may include one or more of an identifier section, a name section, a label section, an attribute section, a description section, and a note section of the ontology item, wherein the identifier section is used to number the ontology item, the name section may be the name of the object as determined by a user, the label section is used to identify the ontology item, the attribute section is used to describe the type of the label, the description section is used to define the ontology item, and the note section is used to describe the relationship between ontology items.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation to the scope of the present disclosure.

In the field of data storage, pure snapshots or copies are usually provided at a local site only or at only two remote sites after storing the data. Later, DPR solutions have gone through synchronous replication, asynchronous replication, and the generation of advanced copies mixed with snapshot copies.

In addition, as the technology has evolved and DPR functions have evolved, so has the corresponding documents, such as feature notes, white papers, and user guides. However, while these documents clearly illustrate a single behavior of a single function, the description of multiple functions may be scattered across a large number of documents. As a result, there exists no quick and convenient approach to obtaining a detailed description of these functions or a description of an integrated behavior of the multiple functions, making it impossible for a user to determine the relationships between these functions and whether these functions are feasible.

At least to address the above and other potential problems, embodiments of the present disclosure propose a method for generating configuration information of a storage system. In this method, upon receiving a request to generate configuration information of a storage system, a computing device acquires attribute information of an object created in the storage system. Then, the attribute information is used to acquire a first ontology item corresponding to the object. In this process, a second ontology item corresponding to an operation executed for the object is also obtained. Then the configuration information of the storage system is generated at least using the first ontology item and the second ontology item. This method enables users to quickly obtain the configuration information of the system, thereby increasing the query efficiency and improving the user experience.

The embodiments of the present disclosure will be further described below in detail with reference to the accompanying drawings. FIG. 1 illustrates a block diagram of example system 100 in which the embodiments of the present disclosure can be implemented. It should be understood that the structure of system 100 is described for illustrative purpose only and does not imply any limitation to the scope of the present disclosure.

As shown in FIG. 1, system 100 includes computing device 104. Computing device 104 receives request 102 from a user to generate configuration information 112 about storage system 106, wherein the configuration information may be presented in the form of an ontology.

Computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Request 102 is used to acquire configuration information 112 of storage system 106 that is configured by the user. FIG. 1 illustrates that computing device 104 receives request 102, for example, receiving request 102 from the user's client device. However, it is merely an example and not a specific limitation of the present disclosure. Computing device 104 can also acquire request 102 from computing device 104.

Computing device 104 has storage system 106 therein that is configured for the user. Upon receipt of request 102 by computing device 104, an object created within storage system 106 is determined, for example, a file system created by the user within storage system 106 for storing data, a replication session for implementing storage of data in the file system to other storage devices, etc. Computing device 104 then obtains ontology item 108 corresponding to this object according to the attribute information of the created object. For the convenience of description, ontology item 108 is also referred to as a first ontology item.

In some embodiments, computing device 104 obtains the category in the attribute information of the created object to generate the first ontology item. In some embodiments, computing device 104 generates the first ontology item based on the state in the attribute information of the object.

Alternatively or additionally, the computing device generates the first ontology item based on the category and state in the attribute information. The above examples are only for describing the present disclosure, rather than specifically limiting the present disclosure. Those skilled in the art can generate the first ontology item according to any suitable information in the attributes of the object.

The relationship between the object and an operation executed for the object is also described in the information included in first ontology item 108. In the process of generating the configuration information, ontology item 110 corresponding to this operation is obtained, and for the convenience of description, ontology item 110 is also referred to as a second ontology item.

In some embodiments, computing device 104 can obtain the attribute information of the object corresponding to the operation. The second ontology item for the operation is then generated based on the attribute information of the object. The second ontology item includes the name of the ontology item that is defined by the user.

In some embodiments, a label of the second ontology item recorded in the description section of the first ontology item can be acquired. The label of the second ontology item is then used to acquire a reference ontology item from a set of reference ontology items to generate the second ontology item.

Then the configuration information of this storage system is generated based at least on the first ontology item and the second ontology item. Only two ontology items 108 and 110 are shown in FIG. 1, which are examples only and not specific limitations to the present disclosure. There may be any suitable number of ontology items corresponding to storage system 106. Thus, any number of ontology items may be included in the configuration information.

The above method enables users to quickly obtain the configuration information of the system, thereby increasing the query efficiency and improving the user experience.

Figure 2:
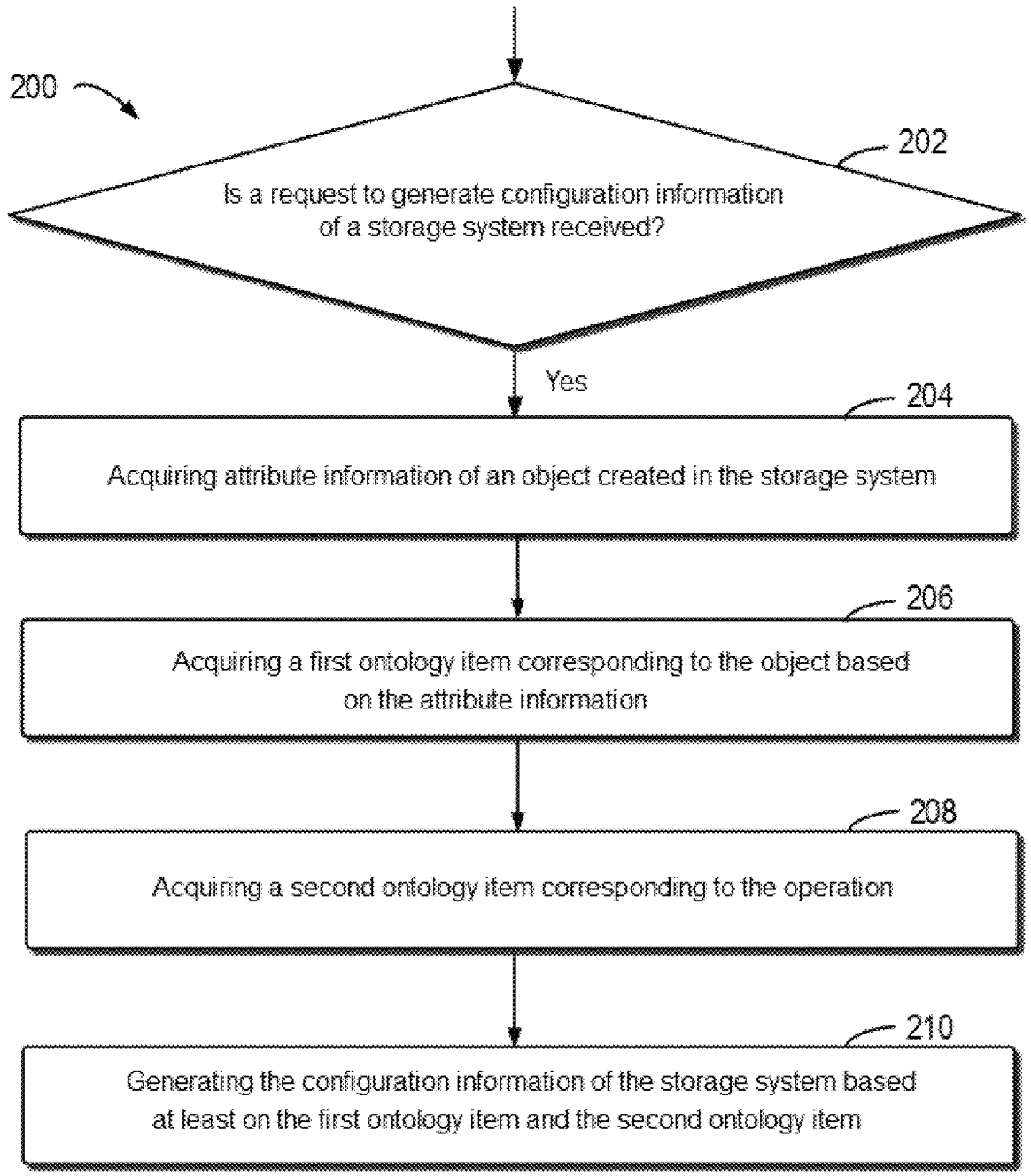
FIG. 2 illustrates a flow chart of method 200 for generating configuration information of a storage system according to embodiments of the present disclosure.

FIG. 2 describes a flow chart of method 200 for generating configuration information of a storage system according to embodiments of the present disclosure. Method 200 can be executed at computing device 104 in FIG. 1 and any suitable computing device. The embodiment of FIG. 2 is further described below in connection with example environment 100 in which the device and/or method according to embodiments of the present disclosure may be implemented as illustrated in FIG. 1.

At block 202, computing device 104 determines whether request 102 to generate configuration information 112 of storage system 106 is received.

In some embodiments, computing device 104 will receive request 102 to generate configuration information 112 from the user's client device. For example, the user can send this request 102 when the user wants to view configuration information 112 of storage system 106 he or she is using. In some embodiments, request 102 to view configuration information 112 of storage system 106 is submitted by the user at computing device 104. The above examples are only for describing the present disclosure, rather than specifically limiting the present disclosure.

If receiving the request to generate the configuration information of the storage system, at block 204, computing device 104 acquires attribute information of an object created in storage system 106.

In generating the configuration information of storage system 106, computing device 104 is to acquire the object created in storage system 106, for example, an object created by the user, such as a file system in the storage system, a session used to achieve synchronous or asynchronous replication of data, etc. Computing device 104 then extracts the attribute information of this object. This attribute information includes the type of the object, the state of the object, and so on.

At block 206, computing device 104 acquires a first ontology item corresponding to the object based on the attribute information, the first ontology item describing a relationship between the object and an operation executed for the object.

In some embodiments, computing device 104 uses the attribute information of the object to determine a first label corresponding to the object. Then, computing device 104 acquires, using the first label, a reference ontology item corresponding to the first label from a set of reference ontology items to generate the first ontology item. The set of reference ontology items is preset by the user and includes multiple reference ontology items. Each reference ontology item includes at least a reference ontology item label, attribute, description, and note. Alternatively or additionally, each reference ontology item may also have a reference ontology item identifier.

Thus, according to the first label, a reference ontology item corresponding to this label can be found from the set of reference ontology items. For example, the attribute, description, and note in the reference ontology item are acquired and then added to the corresponding attribute, description, and note section of the first ontology item for that object. The name in the first ontology item can be set as the name defined by the user for the object. Alternatively or additionally, an ontology item identifier can be set for the first ontology item. In this way, the first ontology item can be generated quickly and accurately, thus saving the user's time and computing resources.

In some embodiments, computing device 104 acquires the type of the object from the attribute information of the object. Computing device 104 then determines the first label based on the type of the object. In an example, if the type of the object is a restore operation, restore can be used as the first label. In another example, if the type of the object is a synchronous session, synchronous session can be used as the first label. Alternatively or additionally, state information is also required in determining the label. For example, if the state of the object is an active state, the label is a synchronous session in the active state. The above examples are used only to describe the present disclosure, and what information in the attribute information of the object forms the label can be set by those skilled in the art as desired. With this approach, the first label can be determined quickly and efficiently, thus saving computing time.

At block 208, computing device 104 acquires a second ontology item corresponding to the operation. In the process of generating the configuration information, computing device 104 also acquires the second ontology item associated with the first ontology item.

In some embodiments, computing device 104 can obtain the attribute information of the object corresponding to the operation, for example, a control that implements the restore operation. The ontology item label corresponding to this operation is then determined based on the attribute information of the object. This ontology item label is then used to obtain a reference ontology item corresponding to the ontology item label from a set of reference ontology items. This reference ontology item is then used to generate the second ontology item for the operation. The second ontology item includes the name of the ontology item that is defined by the user.

In some embodiments, a label of the second ontology item recorded in the description section of the first ontology item can be acquired. The label of the second ontology item is then used to acquire a reference ontology item from a set of reference ontology items to generate the second ontology item. The above examples are only for describing the present disclosure, rather than specifically limiting the present disclosure.

At block 210, computing device 104 generates the configuration information of the storage system based at least on the first ontology item and the second ontology item.

After obtaining the first ontology item and the second ontology item, if other ontology items exist in the storage system, these ontology items are used to generate a description related to the configuration information. In some embodiments, computing device 104 also acquires a relationship ontology item corresponding to the relationship. In an example, computing device 104 acquires the second label corresponding to the relationship ontology item from the first ontology item. Then, computing device 104 acquires, based on the second label, the relationship ontology item corresponding to the label from the set of reference ontology items. In this way, the computing device can quickly determine the relationship ontology item to be used, thus improving the efficiency of acquiring the relationship ontology item.

Further, computing device 104 generates the configuration information of the storage system using at least the first ontology item, the second ontology item, and the relationship ontology item. In this way, the configuration information can be made to include more ontology items, thus making the configuration information clearer. FIG. 3 describes a schematic diagram of document 300 of configuration information according to embodiments of the present disclosure.

As shown in FIG. 3, multiple ontology items among the ontology items in the configuration information are listed. The ontology item identifiers of the multiple ontology items are 00000201, 00000202, 00000206, 00000207, 00000208, and 00000209, respectively. These are intended only as an example and not as a specific limitation to the present disclosure.

Among the multiple ontology items, ontology item 00000201 has the name executable, ontology item 00000202 has the name un-executable, ontology item 00000206 has the name restore, ontology item 00000207 has the name session-1, ontology item 00000208 has the name session-2, and ontology item 00000209 has the name session-3.

Take ontology item 00000207 as an example, it includes an ontology item identifier, name, label, description, and note. This ontology item is used to describe an object with the name session-1, of which the label is a synchronous session in the active state, the function of this ontology item is recorded in the description section, and the relationship with other ontology items is recorded in the note section.

In generating this ontology item, computing device 104 can determine the attribute information of session 1 generated by the user, including the type and state, for example, if its type is synchronous session and its state is active state, then its label can be determined as a synchronous session in the active state. This label is then used to find a reference ontology item corresponding to this label from the set of reference ontology items. The description and note in the reference ontology item found are then used as the description and note sections of ontology item 00000207. Similarly, computing device 104 can obtain the restore ontology item 00000206 and the un-executable ontology item 00000202 in the note section of ontology item 00000207. All the generated ontology items are then combined to form the document of configuration information.

In an example, the label "Restore" is generated based on the attribute information of the restore control created in storage system 206. In another example, the label "Restore" can also be given directly based on the note section of ontology item 00000207. The corresponding ontology item is then generated based on the obtained label. The above examples are only for describing the present disclosure, rather than specifically limiting the present disclosure.

Returning now to FIG. 2 to continue the description, in some embodiments, computing device 104 generates the configuration information in a chart format using the first ontology item and the second ontology item. For ease presentation to the user, the configuration information in the chart format can also be generated, wherein FIG. 4 illustrates a schematic diagram of graph 400 of configuration information according to embodiments of the present disclosure.

Figure 4:
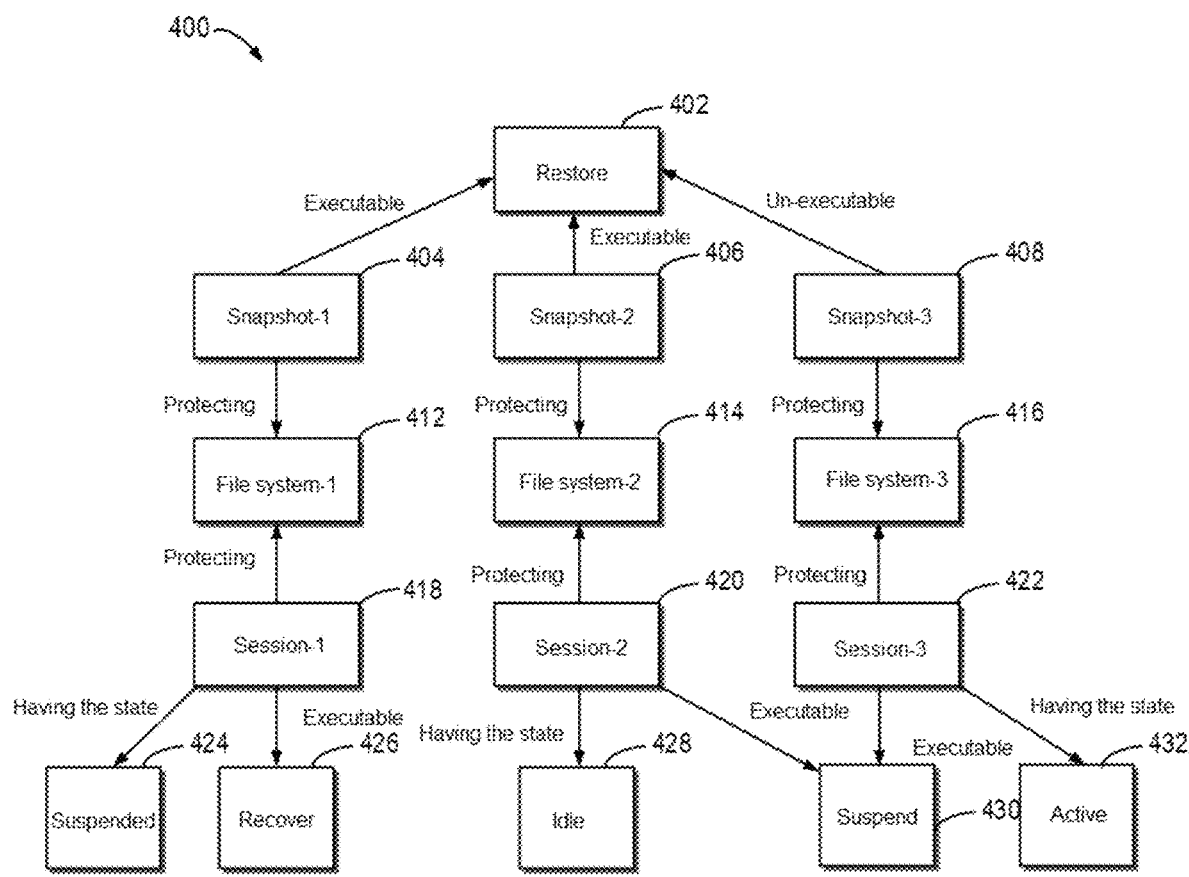
FIG. 4 illustrates a schematic diagram of graph 400 of configuration information according to embodiments of the present disclosure.

Configuration information in the chart format corresponding to the configuration information described in FIG. 3 is described as shown in FIG. 4. Ontology items 412, 414, and 416 represent three ontology items with the names file system-1, file system-2, and file system-3, respectively, which correspond to three file systems created by the user that store various data placed by the user. Ontology items 404, 406, and 408 correspond to snapshots of data stored within the three file systems, respectively. According to the descriptions in the note sections in ontology items 404, 406, and 408, these ontology items can be determined as protecting ontology items 412, 414, and 416. There are also three ontology items 418, 420, and 422 in FIG. 4 with names session-1, session-2, and session-3, that correspond to three session programs set up for the three file systems for use to copy data. As shown in FIG. 3, the relationships of ontology item 402 with the name restore to ontology items 404, 406, and 408 can be determined from the description sections of the three ontology items session-1, session-2, and session-3. In addition, FIG. 4 also illustrates the relationships between ontology item 418 of session-1 and ontology items 424 and 426, the relationships between the ontology item of session-2 and ontology items 428 and 430, and the relationships between ontology item 422 of session-3 and ontology items 430 and 432. For example, when the synchronous session in the active state represented by ontology item 418 has a suspended state, the restore action represented by ontology item 402 is executable for the snapshot represented by ontology item 404. The restore action represented by ontology item 402 is un-executable on the snapshot represented by ontology item 408 while the synchronous session in the suspended state represented by ontology item 422 is in the active state.

Figure 5:
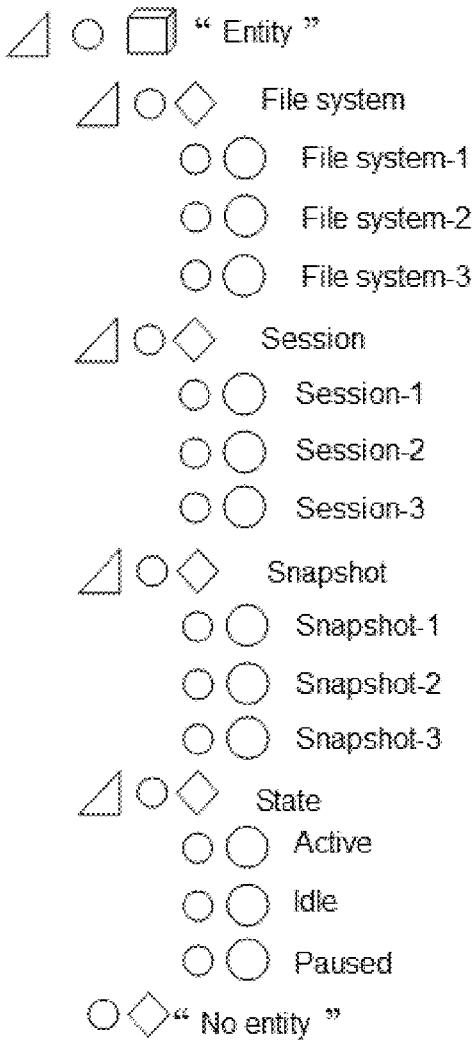
FIG. 5 illustrates a schematic diagram of list 500 of ontology items according to embodiments of the present disclosure.

The ontology items involved in the relationships in FIG. 4 are as follows: executable, un-executable, protecting, having a state, etc. Through FIG. 4, the user can intuitively understand the configuration information of the storage system, and can quickly determine the state and operation of each object. The description in FIG. 4 is merely an example and is not a specific limitation to the present disclosure. For a quicker understanding of the ontology items available in FIG. 4, FIG. 5 further illustrates a schematic diagram of list 500 of ontology items according to embodiments of the present disclosure for easy viewing by the user.

Returning now to FIG. 2 for further description, in some embodiments, the configuration information is automatically regenerated if at least one of the object, operation, and relationship in storage system 106 is adjusted. In some embodiments, the redisplay of the configuration information is triggered by the user after at least one of the object, operation, and relationship in the storage system has been adjusted. The above examples are only for describing the present disclosure, rather than specifically limiting the present disclosure.

The above method enables users to quickly and effectively obtain the configuration information of the system, thereby increasing the query efficiency and improving the user experience.

Figure 6:
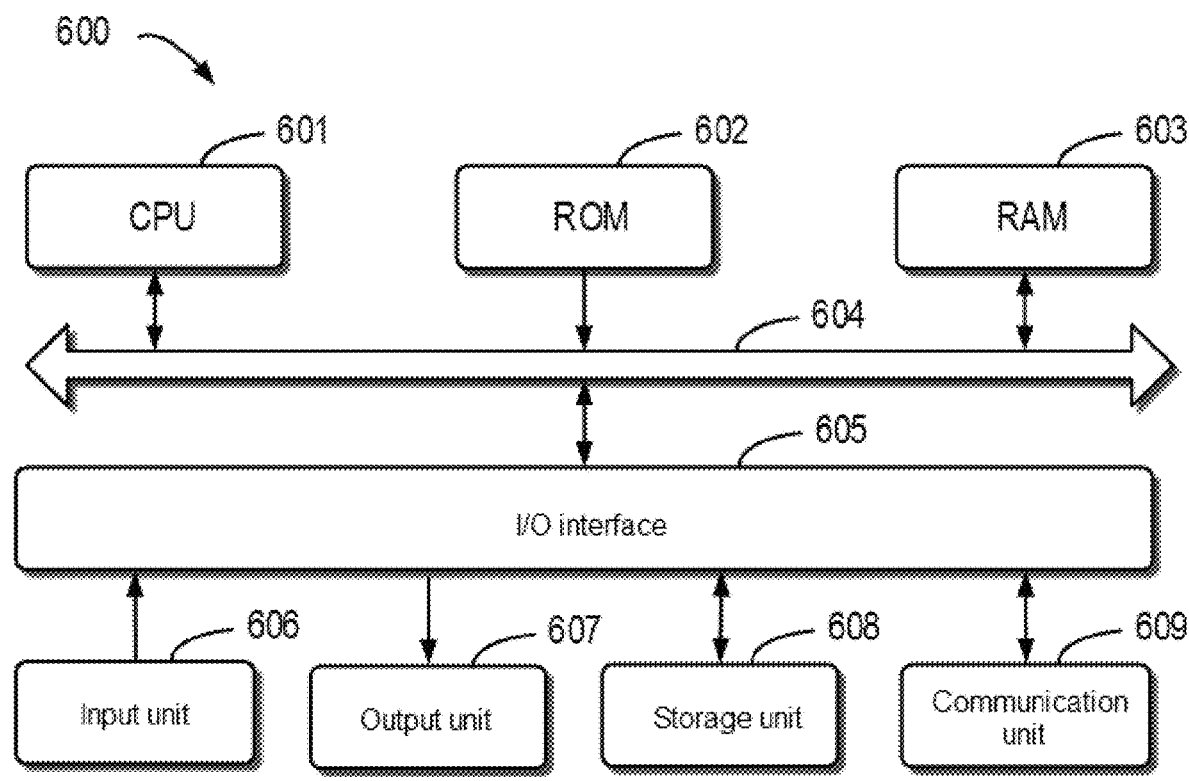
FIG. 6 illustrates a schematic block diagram of example device 600 applicable to implement the embodiments of the content of the present disclosure.

FIG. 6 illustrates a schematic block diagram of example device 600 that can be used to implement the embodiments of the present disclosure. Computing device 104 in FIG. 1 can be implemented using device 600. As shown in the figure, device 600 includes central processing unit (CPU) 601 that may perform various appropriate actions and processing according to computer program instructions stored in read-only memory (ROM) 602 or computer program instructions loaded from storage page 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage page 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, such as method 200, may be executed by processing unit 601. For example, in some embodiments, method 200 may be implemented as a computer software program that is tangibly included in a machine-readable medium, such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, an instruction set architecture (ISA) instructions, machine instructions, machine-dependent instructions, microcode, firmware instructions, state setting data, or source code or object code written in any combination of one or more programming languages, including an object oriented programming language, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be executed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements of technologies on the market, or to enable other persons of ordinary skill in the art to understand the embodiments disclosed here.

The invention claimed is:

1. A method for generating configuration information of a storage system, comprising:
   acquiring, in response to receiving a request to generate configuration information of a storage system, attribute information of an object created in the storage system;
   generating a first ontology item corresponding to the object based on the attribute information, the first ontology item describing a relationship between the object and an operation executed for the object;
   acquiring a second ontology item corresponding to the operation;
   generating the configuration information of the storage system based at least on the first ontology item and the second ontology item;
   adjusting at least one of the object, the operation, and the relationship; and
   regenerating the configuration information in response to at least one of the object, the operation, and the relationship being adjusted;
   wherein generating the configuration information includes generating a graphical representation of the configuration information, the graphical representation including the first ontology item and the second ontology item;
   wherein regenerating the configuration information includes updating the graphical representation;
   wherein generating the first ontology item includes:
   identifying, based on the attribute information of the object, a reference ontology item from a plurality of predefined reference ontology items, a description of the reference ontology item describing the second ontology item; and
   inserting the description of the reference ontology item into a description of the first ontology item to relate the first ontology item and the second ontology item; and
   wherein acquiring the second ontology item includes:
   identifying, based on a label of the second ontology item obtained from the description of the first ontology item, a second reference ontology item from the plurality of predefined reference ontology items, the second reference ontology item being different from the first reference ontology item; and
   inserting a description of the second reference ontology item into a description of the second ontology item to generate the second ontology item.

2. The method according to claim 1, wherein generating the first ontology item corresponding to the object comprises:
   determining, based on the attribute information, a first label corresponding to the object; and
   acquiring, based on the first label, the reference ontology item corresponding to the first label from the plurality of predefined reference ontology items to generate the first ontology item.

3. The method according to claim 2, wherein determining the first label comprises:
   determining a type of the object based on the attribute information; and
   determining the first label based on the type of the object.

4. The method according to claim 1, wherein generating the configuration information of the storage system comprises:
   generating the configuration information in a chart format based on the first ontology item and the second ontology item.

5. The method according to claim 1, further comprising:
   acquiring a relationship ontology item corresponding to the relationship; and
   wherein generating the configuration information of the storage system comprises:
   generating the configuration information of the storage system based on the first ontology item, the second ontology item, and the relationship ontology item.

6. The method according to claim 5, wherein acquiring the relationship ontology item comprises:
   acquiring a second label corresponding to the relationship ontology item from the first ontology item; and acquiring, based on the second label, the second reference ontology item corresponding to the second label from the plurality of predefined reference ontology items to generate the relationship ontology item.

7. The method according to claim 1, wherein generating the first ontology item includes generating, as part of the first ontology item, an indication identifying the operation as currently executable on the object; and wherein the method further comprises:
after generating the configuration information, executing the operation on the object.

8. The method according to claim 7, further comprising:
creating the object in the storage system, the object being a snapshot of data in the storage system;
wherein the operation is a restore operation to restore data from the snapshot.

9. The method according to claim 1, wherein the first ontology item includes a description containing the second ontology item; and
wherein acquiring the second ontology item includes identifying the second ontology item from the description of the first ontology item.

10. The method according to claim 1, wherein acquiring the attribute information of the object includes:
obtaining a label of the object indicating that the object is a session on which data in a first storage device is replicated to a second storage device; and
wherein inserting the description of the reference ontology item into the description of the first ontology item includes:
generating, from the description of the reference ontology item, the description of the first ontology item to indicate whether a restore operation is executable on the session to restore the data from the second storage device.

11. The method according to claim 1, wherein identifying the reference ontology item from the plurality of predefined reference ontology items includes:
performing an assessment operation that compares a label of the object to the plurality of predefined reference ontology items to locate the reference ontology item, the assessment operation indicating that the reference ontology item corresponds to the label of the object.

12. The method according to claim 1, wherein the storage system includes multiple file systems, the file systems being respective objects created in the storage system; and
wherein generating the graphical representation of the configuration information includes providing a chart of relationships between the file systems and other objects created in the storage system.

13. An electronic device, comprising:
at least one processor; and
a memory coupled to the at least one processor and having instructions stored thereon, wherein the instructions, when executed by the at least one processor, cause the device to perform actions comprising:
acquiring, in response to receiving a request to generate configuration information of a storage system, attribute information of an object created in the storage system;
generating a first ontology item corresponding to the object based on the attribute information, the first ontology item describing a relationship between the object and an operation executed for the object;
acquiring a second ontology item corresponding to the operation;
generating the configuration information of the storage system based at least on the first ontology item and the second ontology item;
adjusting at least one of the object, the operation, and the relationship; and
regenerating the configuration information in response to at least one of the object, the operation, and the relationship being adjusted;
wherein generating the configuration information includes generating a graphical representation of the configuration information, the graphical representation including the first ontology item and the second ontology item;
wherein regenerating the configuration information includes updating the graphical representation;
wherein generating the first ontology item includes:
identifying, based on the attribute information of the object, a reference ontology item from a plurality of predefined reference ontology items, a description of the reference ontology item describing the second ontology item; and
inserting the description of the reference ontology item into a description of the first ontology item to relate the first ontology item and the second ontology item; and
wherein acquiring the second ontology item includes:
identifying, based on a label of the second ontology item obtained from the description of the first ontology item, a second reference ontology item from the plurality of predefined reference ontology items, the second reference ontology item being different from the first reference ontology item; and
inserting a description of the second reference ontology item into a description of the second ontology item to generate the second ontology item.

14. The device according to claim 13, wherein generating the first ontology item corresponding to the object comprises:
determining, based on the attribute information, a first label corresponding to the object; and
acquiring, based on the first label, the reference ontology item corresponding to the first label from the plurality of predefined reference ontology items to generate the first ontology item.

15. The device according to claim 14, wherein determining the first label comprises:
determining a type of the object based on the attribute information; and
determining the first label based on the type of the object.

16. The device according to claim 13, wherein generating the configuration information of the storage system comprises:
generating the configuration information in a chart format based on the first ontology item and the second ontology item.

17. The device according to claim 13, wherein the actions further comprise:
acquiring a relationship ontology item corresponding to the relationship; and
wherein generating the configuration information of the storage system comprises:
generating the configuration information of the storage system based on the first ontology item, the second ontology item, and the relationship ontology item.

18. The device according to claim 17, wherein acquiring the relationship ontology item comprises:

acquiring a second label corresponding to the relationship ontology item from the first ontology item; and acquiring, based on the second label, the second reference ontology item corresponding to the second label from the plurality of predefined reference ontology items to generate the relationship ontology item.

19. A computer program product having a non-transitory computer readable medium which stores a set of instructions to generate configuration information of a storage system; the set of instructions, when carried out by computerized circuitry, causing the computerized circuitry to perform a method of:

acquiring, in response to receiving a request to generate configuration information of a storage system, attribute information of an object created in the storage system;

generating a first ontology item corresponding to the object based on the attribute information, the first ontology item describing a relationship between the object and an operation executed for the object;

acquiring a second ontology item corresponding to the operation;

generating the configuration information of the storage system based at least on the first ontology item and the second ontology item;

adjusting at least one of the object, the operation, and the relationship; and regenerating the configuration information in response to at least one of the object, the operation, and the relationship being adjusted;

wherein generating the configuration information includes generating a graphical representation of the configuration information, the graphical representation including the first ontology item and the second ontology item;

wherein regenerating the configuration information includes updating the graphical representation;

wherein generating the first ontology item includes:

identifying, based on the attribute information of the object, a reference ontology item from a plurality of predefined reference ontology items, a description of the reference ontology item describing the second ontology item; and inserting the description of the reference ontology item into a description of the first ontology item to relate the first ontology item and the second ontology item; and wherein acquiring the second ontology item includes:

identifying, based on a label of the second ontology item obtained from the description of the first ontology item, a second reference ontology item from the plurality of predefined reference ontology items, the second reference ontology item being different from the first reference ontology item; and inserting a description of the second reference ontology item into a description of the second ontology item to generate the second ontology item.

* * * * *